ated Apr. 11, 1967

3,313,854
PREPARATION OF PARA-NITRODIPHENYLA-
MINES UTILIZING A COPPER OXIDE CATA-
LYST
Joseph Levy, Paramus, N.J., assignor to Universal Oil
Products Company, Des Plaines, Ill., a corporation of
Delaware
No Drawing. Filed Apr. 23, 1965, Ser. No. 450,535
6 Claims. (Cl. 260—576)

This application is a continuation-in-part of copending applications Ser. No. 153,719, filed Nov. 20, 1961 and Ser. No. 153,737, filed Nov. 20, 1961, both said earlier applications being now abandoned.

This invention relates to a process for the preparation of para-nitrodiphenylamines, and more specifically to an improvement in the preparation through utilization of a copper oxide catalyst.

Heretofore nitrodiarylamines, which are valuable industrial chemicals, were prepared by condensing an aromatic amine with a halonitrobenzene usually in the presence of a copper containing catalyst. The condensation was also usually effected in the presence of a halogen acceptor such as potassium carbonate to neutralize the hydrogen halide formed during the reaction and by continuously removing from the reaction mixture the water formed during the condensation. The results obtained with respect to product yield and purity varied widely, however, depending primarily upon the particular catalyst used and the specific aromatic amine and halonitrobenzene condensed. For example, while certain copper containing catalysts, particularly cuprous cyanide, have been reported to be highly effective in catalyzing the condensation, it has also been reported that other copper containing catalysts including the copper oxides have not proved to be particularly satisfactory for catalyzing the condensation of aromatic amines and halonitrobenzenes. Contrary to this prior teaching, it has now been unexpectedly discovered, however, that highly desirable results are obtained specifically for the condensation of an aromatic amine and a para-halonitrobenzene to form a para-nitrodiphenylamine through utilization of a copper oxide catalyst.

While the properties and characteristics of catalysts cannot always be predicted with certainty nor their operation in any particular reaction readily explained, the remarkable activity of the copper oxides to effect the preparation of para-nitrodiphenylamines is most surprising in view of the fact that such catalysts will not effect with comparable results the preparation of other nitrodiphenylamines such as, for example, the isomeric ortho-nitrodiphenylamines.

Accordingly, it is an object of this invention to provide a process for preparing para-nitrodiphenylamines in yields and purities at levels heretofore unobtainable by utilizing a copper oxide catalyst. A further object is to provide a process for preparing para-nitrodiphenylamines which utilizes a copper oxide catalyst comprising either cuprous or cupric oxide.

As hereinbefore indicated, the preparation of para-nitrodiphenylamines is greatly improved by utilizing a copper oxide catalyst to effect the condensation of a para-halonitrobenzene and an aromatic amine. This improvement is quite remarkable because not only does it involve the obtainment of yields at levels heretofore unobtainable with other catalysts, but it also involves the obtainment of the product in high purity and substantially free of tars and gummy solids, the presence of which heretofore required extensive purification to render the product suitable for further commerical utilization.

The copper oxide catalyst which is utilized according to this invention to achieve these highly desirable effects comprises either cuprous or cupric oxide and also mixtures thereof. Of the two oxides, however, the most desirable results are generally obtained with cupric oxide and for this reason cupric oxide is the preferred catalyst for use in the process of this invention. The copper oxides used as the catalysts may be any of the readily available commercial products. Alternatively, the copper oxide catalyst may be prepared prior to use in the process by subjecting an oxidizable copper compound such as a cuprous halide, for example cuprous chloride, in admixture with a portion of the aromatic amine used in the condensation to the oxidizing action of an oxygen-containing gas such as air. This oxidative treatment is effected at temperatures and for periods of time sufficient to convert at least a portion of the copper salt to a copper oxide.

The p-halonitrobenzenes which may be used in the process of this invention have the following generic formula:

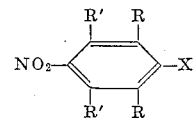

in which X is a halogen radical, preferably chlorine or bromine, and the R substituents are selected from the group consisting of hydrogen, alkyl radicals containing from 1 to about 5 carbon atoms and halogen radicals and the R's are radicals selected from the group consisting of hydrogen and alkyl radicals of from 1 to about 5 carbon atoms. Examples of these compounds include p-chloronitrobenzene, p-bromonitrobenzene, 3,4-dichloronitrobenzene, 2-methyl-4-chloronitrobenzene, 3-methyl-4-chloronitrobenzene, 2-ethyl-4-chloronitrobenzene, 2,3-dimethyl-4-chloronitrobenzene, 2,5-dimethyl-4-chloronitrobenzene or 3,5-dimethyl-4-chloronitrobenzene.

The aromatic amines which may be condensed with the above class of p-halonitrobenzenes according to the process of this invention have the following generic formula:

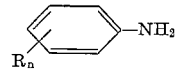

wherein $R_n$ is selected from the group consisting of hydrogen, lower alkyl, alkoxy and halogen radicals, and $n$ is an integer from 1 to 2. Examples of these compounds include aniline, o-toluidine, m-toluidine, p-toluidine, p-ethylaniline, p-butylaniline, p-anisidine, o-anisidine, m-anisidine, p-phenetidine, p-chloroaniline, p-bromoaniline or 2,4-dichloroaniline.

Examples of the p-nitrodiphenylamines prepared by condensing an aromatic amine and a halonitrobenzene of the above illustrated classes according to the process of this invention include 4-nitrodiphenylamine, 2-methyl-4'-nitrodiphenylamine, 4-methyl-4'-nitrodiphenylamine, 4-methoxy-4'-nitrodiphenylamine, 4-chloro-4'-nitrodiphenylamine, 2,4-dichloro-4'-nitrodiphenylamine, 2,4-dimethyl-4'-nitrodiphenylamine, 4-bromo-4'-nitrodiphenylamine, 4-methyl-2'-chloro-4'-nitrodiphenylamine or 2,6-dimethyl-4-nitrodiphenylamine.

The condensation of the aromatic amine and the para-halonitrobenzene is effected according to this invention by heating the reactants, preferably using about a 100% excess of the aromatic amine, in the presence of the copper oxide catalyst at an elevated temperature ranging from about 150° to 250° C. and more preferably from about 180° to 210° C. The quantity of the copper oxide catalyst utilized is not critical and may be a catalytic amount varying within the range of from about .01 to 5 percent by weight based upon the total weight of the aromatic amine and para-halonitrobenzene, with amounts of from about 0.1 to 0.5 percent generally being preferred.

In order that the product yield be of the desired level, it is essential that in addition to the use of the copper oxide catalyst, there also be present in the reaction mixture an appropriate quantity of a halogen acceptor to neutralize the hydrogen halide generated during the condensation. Suitable for this purpose are a wide class of basic materials such as the alkali metal carbonates. Of this general class, however, the most desirable material is potassium carbonate. The quantity of potassium carbonate used may range from about one equivalent based upon the quantity of para-halonitrobenzene present in the reaction mixture up to about a 50% excess with an amount ranging from about 10 to 25% excess generally being preferred.

In conducting the condensation it has been discovered that the time required to effect the condensation will be substantially lowered by having a relatively small amount of the formyl derivative of the aromatic amine condensed, for example, formanilide when using aniline, present in the reaction mixture to act as an accelerator for the condensation. The quantity of the accelerator compound used for this purpose may range from about 0.1 to 5 percent of the total weight of the aromatic amine and the p-halonitrobenzene.

The condensation may be effected in a continuous, semi-continuous or batch-type operation. A batch-type operation is preferred, however, and may be illustrated as follows:

The reactants along with the desired catalyst, halogen acceptor and accelerator compound, if one is desired, are placed in an appropriate apparatus. The apparatus is then preferably purged with an inert gas such as nitrogen to remove substantially all of the air which may be present in the system. While it is not essential that the condensation be effected in the substantial absence of air, it generally it preferred to operate in this manner so as to minimize oxidative side reactions. The reaction mixture is then heated to the desired temperature and the condensation reaction allowed to proceed.

To obtain satisfactory results, it is essential that the water which is formed during the condensation be removed from the reaction mixture. If the water is not removed and is allowed to remain in the reaction mixture the condensation will not generally proceed to completion. To accomplish this removal, it has been found most advantageous to utilize an azeotroping agent. The azeotroping agent used for this purpose encompasses any suitable inert solvent such as toluene or xylene with xylene being particularly preferred. The removal of water utilizing the azeotroping agent may be effected in conventional manner such as with the use of a fractionating column equipped with water trap above the reaction mixture.

As hereinbefore indicated, the use of a copper oxide catalyst results in the direct obtainment of a high yield of a substantially pure product which does not require extensive purification to render it suitable for further commercial utilization. This is, of course, in sharp contrast to the prior art processes using different copper containing catalysts where extensive purification, for example, distillation in high vacuum, is usually required to free the product from considerable amounts of tars or gummy side products.

A further advantage obtained through the use of the copper oxide catalyst is that reductive dehalogenation, which usually accompanies this type of condensation to produce nitrobenzene from the halonitrobenzene reactant, is substantially eliminated. Thus any excess aromatic amine used in the condensation is recovered substantially free of such contaminating material (usually less than 1%) and may be directly reused in the condensation as the aromatic amine reactant.

The following examples are given to illustrate the process of this invention, but are not, however, intended to limit the generally broad scope of the present invention in strict accordance therewith.

EXAMPLE I

A reaction mixture comprising 315 g. of p-chloronitrobenzene, 332 g. of aniline, 176 g. of anhydrous potassium carbonate and 18 g. of xylene was charged into a reaction flask equipped with a stirrer and a fractionating column, the top of which was fitted with a water separator filled with xylene. In addition to this 2 g. of cupric oxide and 5 g. of formanilide were charged to the flask. The reaction mixture was then heated to reflux temperature (a pot temperature of about 185° C. and an overhead temperature of about 140° C.). The condensation reaction commenced with an evolution of carbon dioxide and water. The water was removed as it formed by the use of xylene azeotroping agent. The theoretical amount of water was collected after a period of about 11 hours during which time the pot temperature rose to about 200° C. The reaction flask and contents thereof were cooled, and the contents diluted with a mixture of 500 g. of water and 750 g. of xylene, following which, the xylene extract was separated, washed with water and subjected to fractional distillation. After removal of the xylene, the unreacted p-chloronitrobenzene and excess aniline were revcovered. It was found that the recovered aniline contained less than 1% of nitrobenzene thus indicating the relative absence of any reductive dehalogenation side reactants. In addition, it was found that only about 2% of the p-chloronitrobenzene which was originally charged to the reaction was recovered indicating that a virtually complete reaction had taken place. The desired product comprising p-nitrodiphenylamine remained in the pot and crystallized upon cooling. This product which was not further purified comprised 415 g. of crystalline material melting at about 122° to 125° C. which analyzed as 92% p-nitrodiphenylamine by both ultra violet and infrared examination. The yield of p-nitrodiphenylamine on a 100% basis was 89% of theory.

EXAMPLE II

In this example a reaction mixture comprising 315 g. of p-chloronitrobenzene, 332 g. of aniline, 176 g. of anhydrous potassium carbonate and 18 g. of xylene was charged to a flask provided with a stirrer and a fractionating column similar in design to that set forth in Example I. In addition, a mixture comprising 2 g. of cupric oxide, 5 g. of formanilide and 20 g. of aniline which had been preheated to 100° C., was charged to the flask. The reaction mixture was then treated in a manner similar to that recited in Example I. The reaction was completed in about 9 hrs. After cooling and treatment with a water-xylene mixture, the xylene extract was recovered, again washed with water and distilled. The unreacted p-chloronitrobenzene and aniline were recovered, the aniline containing less than 1% of the side-product, nitrobenzene. There was again obtained 415 g. of the desired p-nitrodiphenylamine which had a melting point of from 123–126° C. and analyzed as 92% of p-nitrodiphenylamine. The yield of p-nitrodiphenylamine on a 100% basis was 89% of theory.

EXAMPLE III

In order to illustrate the results obtained when the condensation is effected in the absence of an accelerator component, another experiment was run. A reaction mixture similar to that set forth in Example I was condensed in the presence of 2 g. of cupric oxide with the accelerator compound formanilide, being omitted. The mixture was heated as in Example I and required 14 hrs. for completion of the reaction. Upon treatment of the reaction product as more fully set forth in Example I, there were obtained 421 g. of the desied p-nitrodiphenylamine having a melting point of about 122–125° C. and analyzing 92% purity. The yield of p-nitrodiphenylamine on a 100% basis was 90.5%.

EXAMPLE IV

In this example 315 g. p-chloronitrobenzene, 332 g. of aniline, 176 g. of anhydrous potassium carbonate and 18 g. of xylene were charged into a flask equipped with a stirrer and a fractionating column. The top of the fractionating column was fitted with a water separator filled with xylene. To this was added a copper oxide catalyst containing mixture prepared by heating 2 g. of cuprous chloride, 5 g. of formanilide, 2 g. potassium carbonate and 20 g. of aniline at a temperature of about 100° C. for a period of about 0.5 hr. while passing a stream of air above the surface of the mixture.

The flask containing the reaction material was flushed with nitrogen and then heated to reflux temperature (about 185° C. pot temperature and an overhead temperature of about 140° C.). The condensation reaction thereupon commenced with the evolution of carbon dioxide and water. The theoretical amount of water was collected in about 11.5 hrs. during which time the flask temperature rose to 200° C. The reaction mixture was then cooled and diluted with a mixture of 500 g. of water and 750 g. of xylene, following which, the xylene extract was separated, washed with water and distilled. After removing the xylene, unreacted p-chloronitrobenzene and excess aniline were recovered. It was found that the recovered aniline contained less than 1% of nitrobenzene while only about 2% of the p-chloronitrobenzene originally charged was recovered indicating that virtually complete reaction had occurred. The fact that the recovered aniline contained only what amounted to trace amounts of nitrobenzene indicated the relative absence of reductive dehalogenation side reactions. The desired p-nitrodiphenylamine remained in the pot and crystallized upon cooling. There was obtained without purification, 393 g. of product which melted at about 122°–125° C. and analyzed at about 92% of purity. The yield of p-nitrodiphenylamine on a 100% basis was 84.5% of theory.

EXAMPLE V

The process of Example I was repeated using cuprous oxide as the catalyst instead of cupric oxide. The reaction required about 22 hrs. to proceed to completion and there was obtained 417 gms. of product analyzing 89.5% purity and melting at 119°–122° C. The yield on a 100% basis was 87% of theory. Again, the recovered aniline contained a small amount of nitrobenzene, about 0.5%, indicating that relatively little reductive dehalogenation had taken place.

EXAMPLE VI

In this experiment ortho-nitrodiphenylamine was prepared using a cupric oxide catalyst. The results of this example may be contrasted with those of Examples I to V to demonstrate the unusual selectivity of the copper oxide catalyst of this invention to prepare the para-nitrodiphenylamines in contrast to other nitrodiphenylamines.

A reaction mixture comprising 154.6 gms. o-chloronitrobenzene, 196 gms. aniline, 89 gms. potassium carbonate, 22 gms. toluene and 0.1 gm. cupric oxide was charged into a reaction flask equipped with a stirrer and a fractionating column, the top of which was fitted with a water trap. The apparatus was flushed with nitrogen and then heated to reflux (pot temperature of about 181° C.). Reaction proceeded with evolution of carbon dioxide and water, the latter being removed by the toluene azetroping agent. The reaction was completed in about 11 hours during which time the pot temperature rose to about 190° C. The mixture was then cooled, treated with 250 gms. water and 373 gms. xylene, after which, the xylene extract was separated, washed with hot water and fractionally distilled. After removal of the solvent, the unreacted o-chloronitrobenzene and the excess aniline were recovered. This recovered material contained only a relatively small amount of ortho-chloronitrobenzene and about 23% nitrobenzene indicating that considerable reductive dehalogenation had taken place. The residual product comprising 145.5 gm. analyzed only 88% ortho-nitrodiphenylamine (54% yield of theory on 100% basis). The recovered amine fraction was also found to contain product which had been co-distilled amounting to a maximum of about 9% of theory, for a total maximum yield of only about 63% of theory.

I claim as my invention:

1. A process for the preparation of a p-nitrodiphenylamine which comprises condensing a p-halonitrobenzene of the formula:

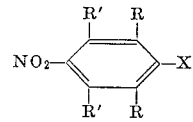

in which X is chlorine or bromine, R is hydrogen, alkyl of from 1 to 5 carbon atoms, chlorine or bromine, and R' is hydrogen or alkyl of from 1 to 5 carbon atoms, with an aromatic amine of the formula:

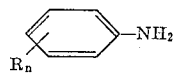

in which R is hydrogen, lower alkyl, methoxy, ethoxy, chlorine or bromine and $n$ is an integer of from 1 to 2, in the presence of potassium carbonate and a copper oxide catalyst at a temperature of from about 150° C. to 250° C. while removing the water formed during the condensation, and recovering the product.

2. The process of claim 1 further characterized in that said oxide is cupric oxide.

3. The process of claim 1 further characterized in that said oxide is cuprous oxide.

4. The process of claim 1 further characterized in that the condensation is effected in the presence of the formyl derivative of said aromatic amine.

5. A process for the preparation of p-nitrodiphenylamine which comprises condensing p-chloronitrobenzene with aniline in the presence of potassium carbonate and a copper oxide at a temperature of from about 150° to 250° C. while removing the water formed during the condensation, and recovering the product.

6. A process for the preparation of p-nitrodiphenylamine which comprises condensing p-chloronitrobenzene with aniline in the presence of potassium carbonate, formanilide and a copper oxide at a temperature of from about 180° to 210° C. while removing the water formed during the condensation, and recovering the product.

References Cited by the Examiner

UNITED STATES PATENTS

| 2,924,620 | 2/1960 | Miller | 260—576 |
| 2,927,943 | 3/1960 | Merz | 260—576 |

FOREIGN PATENTS

| 602,118 | 7/1960 | Canada. |
| 507,860 | 6/1939 | Great Britain. |
| 839,420 | 6/1960 | Great Britain. |

CHARLES B. PARKER, *Primary Examiner.*

R. V. HINES, *Assistant Examiner.*